United States Patent Office 3,308,947
Patented Mar. 14, 1967

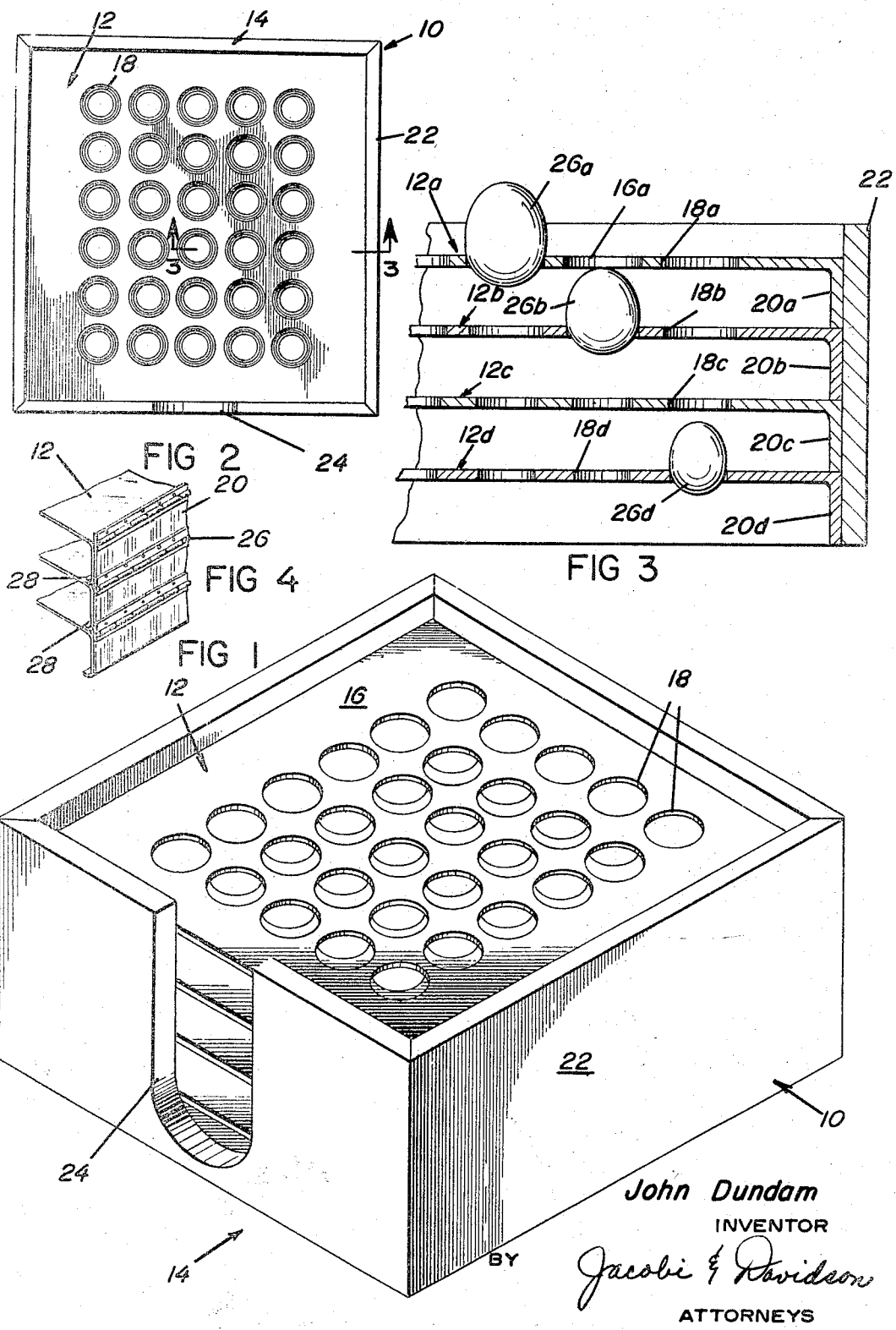

3,308,947
EGG GRADER
John Dundam, 15 Chestnut St., Oneonta, N.Y. 13820
Filed Feb. 12, 1965, Ser. No. 432,338
1 Claim. (Cl. 209—123)

This invention relates to an egg grader which can be used to grade eggs by size.

It is well known that eggs come in a variety of different sizes, and that for commercial purposes, such eggs must be separated and classified or "graded" according to size. Such grading takes place before eggs are placed into the conventional dozen egg carton, and thus the price assigned to that carton is determined by the size of the eggs contained therein. For instance, a grocer or other vendor of eggs will sell a carton of one dozen extra large eggs for some specific price, will sell a carton of one dozen large eggs for a somewhat lesser price, and so on.

Naturally, since eggs are fragile items, it is desirable to minimize the handling thereof, yet, as aforesaid, it is necessary to classify or grade the various sizes of eggs. In the past, there have been attempts to provide egg grading devices which could simultaneously grade several eggs, but such devices did not prove to be altogether satisfactory. Typical of such prior art grading devices is that shown in U.S. Patent No. 1,370,629, issued to V. Clairemont. In this device, a plate having sized openings therein was disposed above a conveyor, and eggs were placed in the plate. If the eggs were larger than the openings in the plate, they would not fall through such openings, but if the eggs were smaller than the openings in the plate, they would drop through such openings and onto the conveyor therebeneath. Such a grader was thus a "go-no-go" type which merely separated eggs larger than the plate openings from those smaller than such openings. It did not provide any selective separation or grading of eggs according to their differing sizes.

There have also in the past been other forms of egg grading devices, but these too have proved unsatisfactory. Some such devices required multiple handling of the eggs, thereby greatly increasing the danger of breakage. Other such devices were large and intricate machines which carefully examined and analyzed each egg, but such machines were extremely complicated and cumbersome and their cost was disproportionate to the function they were to accomplish.

With the foregoing in mind, it is, therefore, an object of the present invention to overcome the difficulties and deficiencies associated with the prior art and to provide in their stead, a new and improved egg grader.

Another object of the present invention is to provide a unit which can simultaneously selectively grade by size, a plurality of eggs.

Further objects of the present invention include the provision of an egg grader which: (a) is simple and inexpensive to produce, yet is durable and capable of extended periods of operation; (b) is compact in nature and requires only a minimum of space; (c) minimizes the number of times the eggs must be handled; (d) separates the eggs according to size and enables all eggs of one particular size to simultaneously be removed from the grader and deposited in a desired location; (e) requires no special operating skills and can be utilized by one having the most routine skills; and (f) minimizes the amount of manual manipulation or handling of the eggs.

Other objects, advantages and salient features of the present invention will become apparent from the following detailed description, which, taken in conjunction with the annexed drawings, discloses a preferred embodiment thereof.

The foregoing objects are attained by providing a carton containing a series of vertically spaced superposed sheets or plates, each plate having a plurality of specially sized apertures therein. The apertures in each plate are all of equal size, but in the vertical direction, the apertures gradually diminish in size from the top plate to the bottom one. That is, the top plate has a large aperture, the plate immediately therebeneath has a slightly smaller opening, the plate beneath that has a still smaller opening, and so on. All of the apertures are vertically aligned with one another, so that when an egg is placed in the largest aperture in the top plate, such egg will either seat on the rim of that aperture or will drop downward and seat on the rim of some lower aperture. Once one egg has been dropped into each of the vertically aligned rows of apertures, the plates can be individually removed from the carton. The top plate will carry all of the extra large eggs, the plate immediately therebeneath will carry all of the large eggs, the next lower plate will carry the next smaller size eggs, and so on.

Referring to the drawings:

FIGURE 1 is a perspective view of an egg grader in accordance with the principles of the present invention;

FIGURE 2 is a top plan view of the egg grader of FIGURE 1,

FIGURE 3 is a fragmentary sectional view taken along line 3—3 of FIGURE 2, and

FIGURE 4 is a fragmentary perspective view of a modified form of egg grader.

In general, the present invention provides an egg grader generally designated 10 including a plurality of grading plates or sheets generally designated 12, and a carton means generally designated 14 for maintaining the sheets 12 in their proper disposition.

Referring now in greater detail to the drawings, it will be seen that each grading sheet 12 includes a flat, rigid central section 16 having a plurality of apertures 18 therein. A depending skirt 20 projects downwardly from the periphery of the central section 16. The sheet 12 can be fabricated of plastic, metal, or any other suitable rigid material, and preferably the skirt and central section are integral.

Since several such sheets 12 are provided, in vertically spaced disposition, the uppermost sheet can be designated 12a and can include a central section 16a, apertures 18a and a skirt 20a. Similarly, the next lower sheet can be designated 12b, can include a central section 16b, apertures 18b and a skirt 20b; the next lower sheet can be designated 12c, and so on.

Several apertures 18 are provided in each sheet 12, thirty such apertures being shown in the illustrated embodiment. The apertures in any one sheet are all of equal size; that is, each of the apertures 18a is of the same size, each of the apertures 18b is of the same size, and so on. However, the apertures in each different sheet are of a different size, with apertures gradually diminishing in size from the uppermost to the lowermost sheet. Thus, as shown in FIGURE 3, where four sheets 12a, 12b, 12c and 12d are provided, the aperture 18a is the largest, the aperture 18b is smaller, the aperture 18c is still smaller, and the aperture 18d is the smallest.

A carton 14 is provided for maintaining the sheets 12 in stacked deposition. The carton has upstanding side walls 22 which circumscribe a shape corresponding to that of the sheets 12, and the sheets 12 are placed within these side walls. As can be seen from FIGURE 3, each sheet 12 rests upon its skirt 20, with each skirt 20 resting upon the peripheral edge of the sheet beneath it. The sheets 12 are preferably vertically disposed within the carton 14, and are maintained in spaced superposition with one another with the spacing being determined by the depth of the skirts 20.

When the sheets 20 are placed within the carton, and are maintained in their stacked superposed vertical relation, the apertures in each sheet are vertically aligned with the apertures in each other sheet. Thus, an aperture 18a will be axially aligned with apertures 18b, 18c and 18d to form a row of apertures, with the apertures in each row decreasing in size and in a downward direction.

At least one recess 24 is formed in the side wall 22 of the carton or frame 14, with the recess extending downward from the top edge of the side wall to almost the base thereof. This recess permits the sheets 12 to be placed in or lifted out of the carton 14. It is also possible to provide two such recesses, disposed on opposite side walls 22, to thus simplify the lifting and lowering of the sheets 12. If desired, the skirt 20 can be eliminated on one or more sides of the sheet 12 thus facilitating manual gripping of the sheet through the recess 24.

The size of the apertures 18 is varied to be very slightly smaller than the preferred egg size, so that an egg placed in the aperture will rest or seat upon its rim. In the preferred embodiment of the invention, thirty apertures are provided in each plate, with such apertures being spaced equidistantly apart to conform exactly to the spacing between recesses in conventional commercial egg cartons. Sheet 12a, which is to selectively size extra large eggs, is provided with circular apertures 18a having a diameter of $1^{11}/_{16}$ inches. Sheet 12b, which is to selectively size larger eggs, is provided with circular apertures 18b having a diameter of $1^{5}/_{8}$ inches. Sheet 12c, which is to selectively size medium eggs, is provided with circular apertures having a diameter of $1^{9}/_{16}$ inches. Sheet 12d, which is to selectively size small or pee-wee eggs, is provided with circular apertures having a diameter of $1^{1}/_{2}$ inches.

In operation, all of the sheets 12 are placed within the carton or frame 14. An egg carton having thirty eggs therein is inverted upon the uppermost sheet 12a. The eggs from each of the recesses in the carton thus drop downwardly, under their own weight, through a row of axially aligned vertical apertures. If an egg 26a has a size in excess of the diameter of an aperture 18a, the egg will remain seated in that aperture, as shown in FIGURE 3. All eggs having a size smaller than the aperture 18a, will drop therethrough, by gravity. If an egg 26b is smaller than the aperture 18a but larger than the aperture 18b, it will become seated in aperture 18b. If it is smaller than either 18a or 18b, it will continue downward and will seat in either aperture 18c or aperture 18d.

Once all of the eggs have dropped into their rows and have been properly graded by size, the sheets 12 can be removed from the carton 14. When sheet 12a is removed, it will carry all of the extra large eggs. When the sheet 12b is removed, it will carry all of the large eggs, and so on.

In the modified form of egg grader shown in FIGURE 4, the carton or frame 14 is eliminated and an elongated piano hinge 26 can be connected between each pair of adjacent skirts 20, and thus the sheets can be pivotally raised, when desired, without being fully disconnected from one another. In a modification of this type, since the frame 14 is eliminated, inwardly extending flanges 28 can be provided at the bottom of each skirt 20 to thus lend more stability to the grader.

After reading the foregoing detailed description, it should be apparent that the objects set forth at the outset of the specification have been successfully achieved. Accordingly, what is claimed is:

An egg grader comprising:
a plurality of grading sheets;
each of said sheets having a plurality of apertures therein;
said apertures in each individual sheet being substantially equal in size to the other apertures in that sheet; and
means maintaining said grading sheets in spaced superposed substantially vertical disposition with the apertures in each sheet being directly aligned with the apertures in each other sheet;
said grading sheets in vertical disposition defining an uppermost sheet, a lowermost sheet and at least one intermediate sheet;
each aperture in said uppermost sheet having aligned directly therebeneath, an aperture in each intermediate sheet and an aperture in said lowermost sheet;
said aligned apertures defining axially aligned rows of apertures;
said apertures in each aligned row progressively diminishing in size from the uppermost to the lowermost aperture;
said grader being operative when an egg is dropped into each of said axial rows of apertures to permit said egg to gravitationally descend under its own weight until it reaches an aperture having a size smaller than its size whereupon said egg will remain retained within said aperture;
said means including a depending peripheral skirt upon each of said sheets and an inturned flange means at the lower end of each peripheral skirt; said inturned flange means extending partially under said sheet whereby, when said sheets are disposed in said vertical disposition, the inturned flange means from one sheet rests upon the peripheral margin of the next lower sheet;
said means further including a plurality of elongated hinge means, each such hinge means being connected between the lower edge of one peripheral skirt and the upper edge of the peripheral skirt of the next lower sheet;
said sheets being separable from one another by swinging movement about said hinge means, once an egg has been dropped through each of said aligned rows of apertures, whereby each of said sheets will carry eggs having a size grading larger than the apertures therein but smaller than the apertures in the sheet directly thereabove.

References Cited by the Examiner

UNITED STATES PATENTS

| 201,426 | 3/1878 | Laflin et al. | 217—26 |
| 578,353 | 3/1897 | Nelson | 217—13 |
| 748,836 | 1/1904 | Batdorf. | |
| 883,451 | 3/1908 | Collier | 217—13 |
| 1,140,005 | 5/1915 | Schverma | 217—13 |
| 1,148,914 | 8/1915 | McGaffick | 209—85 |
| 1,149,615 | 8/1915 | Batdorf. | |
| 3,119,491 | 1/1964 | McCormick | 206—56 |

FOREIGN PATENTS

| 1,095,740 | 12/1954 | France. |

M. HENSON WOOD, Jr., *Primary Examiner.*

J. N. ERLICH, *Assistant Examiner.*